United States Patent [19]

Caron et al.

[11] Patent Number: 5,728,419
[45] Date of Patent: Mar. 17, 1998

[54] ICE CONFECTIONERY PRODUCT AND PREPARATION THEREOF

[75] Inventors: Pierrette Caron, Beauvais; Sylvie Jousset, Mours, both of France

[73] Assignee: Nestec S.A., Vevey, Switzerland

[21] Appl. No.: 399,185

[22] Filed: Mar. 6, 1995

[30] Foreign Application Priority Data

Mar. 28, 1994 [EP] European Pat. Off. ............ 94104854

[51] Int. Cl.6 ........................................... A23G 9/00
[52] U.S. Cl. ..................... 426/565; 426/100; 426/101; 426/103; 426/104; 426/389; 426/420; 426/421; 426/477; 426/512; 426/515; 426/591; 426/658; 426/660
[58] Field of Search ..................... 426/660, 565, 426/658, 512, 389, 390, 420, 421, 515, 521, 101, 91, 104, 591, 100, 103, 477

[56] References Cited

U.S. PATENT DOCUMENTS

| | | | |
|---|---|---|---|
| 2,036,706 | 4/1936 | Law | 426/660 |
| 3,623,889 | 11/1971 | Falconer et al. | 426/660 |
| 4,021,583 | 5/1977 | Arden | 426/660 |
| 4,286,890 | 9/1981 | Dickman et al. | 401/19 |
| 4,738,862 | 4/1988 | Bee | 426/565 |
| 4,857,352 | 8/1989 | Miller et al. | 426/660 |
| 5,084,295 | 1/1992 | Whelan et al. | 426/565 |
| 5,343,710 | 9/1994 | Cathenaut et al. | 62/71 |

FOREIGN PATENT DOCUMENTS

| | | |
|---|---|---|
| 0437927A2 | 7/1991 | European Pat. Off. . |
| 0437927A3 | 7/1991 | European Pat. Off. . |
| 1136721 | 12/1968 | United Kingdom . |

*Primary Examiner*—Lien Tran
*Attorney, Agent, or Firm*—Vogt & O'Donnell LLP

[57] ABSTRACT

A frozen ice confectionery product has a first ice layer containing a first effervescence-producing agent and a second ice layer containing a second effervescence-producing agent. The first and second ice layers are juxtaposed and are not separated by a water-impermeable intermediary. Upon dissolution of the first and second ice layers in the mouth upon eating, the first and second effervescence-producing agents react to produce carbon dioxide.

18 Claims, No Drawings

ICE CONFECTIONERY PRODUCT AND PREPARATION THEREOF

BACKGROUND OF THE INVENTION

The present invention relates to an ice confectionery article which effervesces when eaten, and a method for the production of this article.

The production of ice articles that effervesce in contact with water in the mouth when eaten and thus provide a sensation of fizziness of the same type as that obtained with gaseous drinks raises a problem. In gaseous drinks, the fizzy sensation comes from the pressurised carbon dioxide. In an ice, this gas is dissolved and evaporates without providing the required sensation.

A solution to this problem has been proposed, in particular in French Patent Application Publication No. 1,573,397, by incorporating in the ice powdered effervescence reagents coated with a substance which is impermeable to water, a fatty material which can liquefy in the mouth and then release the reagents which, once present in solution in the water, react and release carbon dioxide. The effervescence reagents are preferably dispersed together in the fatty material by means of a dispersing agent, then the mixture is formed into microballs by atomisation in liquid nitrogen. This method is relatively complex and only a slight sensation of effervescence is obtained in the mouth as a result of the need to use a fat with a relatively high melting point for the coating which can only slowly release the effervescence reagents since it does not dissolve very rapidly in the mouth.

SUMMARY OF THE INVENTION

The present invention provides an ice confectionery article containing effervescence reagents, able to provide a sensation of fizziness in the mouth by rapid release of carbon dioxide, characterised in that the effervescence reagents are separate from one another in space and placed directly in juxtaposed ice layers of the article without the intermediary of an agent which is impermeable to water.

The frozen ice confectionery product of the invention comprises, in particular, a first ice layer which contains a first effervescence-producing agent and a second ice layer which contains a second effervescence-producing agent, wherein the first and second ice layers are juxtaposed and are not separated by a water-impermeable intermediary, and wherein, upon dissolution of the first and second ice layers in the mouth upon eating the frozen product, the first and second effervescence-producing agents react to produce carbon dioxide.

The invention also provides a process for making a frozen ice confectionery product comprising introducing into a first mould a first aqueous composition comprising a first effervescence-producing agent; freezing the first composition in the first mould to form a first ice layer; demoulding the first ice layer; inserting the demoulded first ice layer into a second mould which contains a second aqueous composition comprising containing a second effervescence-producing agent; and freezing the second composition in the second mould to form a composite frozen ice confectionery product having juxtaposed first and second layers which are not separated by a water-impermeable intermediary. Upon dissolution of the first and second ice layers in the mouth, the first and second effervescence-producing agents react to produce carbon dioxide.

DETAILED DESCRIPTION OF THE INVENTION

Ice confectionery articles coming within the scope of the invention may be in the form of bars, ice lollies, cones or small tubs. It is necessary for the layers containing the reagents to mix in the mouth thereby causing the reagents to come into contact when the article is sucked, crunched or eaten with a spoon.

According to the invention, the articles are preferably ice lollies with a stick or small cylinders to be sucked or crunched contained in a casing from which they are progressively extracted by pressure. For this type of article of elongate shape, the configuration of the ice layers leading to the desired result is therefore a longitudinal arrangement juxtaposed throughout, for instance in stripes or helices or in a star-shaped or square cross-section substantially forming part of a circle or an oval.

The article may have a homogeneous appearance with juxtaposed layers that are not visually differentiated or may be composed of contrasting juxtaposed layers of ice of different colours and flavours. The composition of the ice may preferably be that of a water ice or a sorbet and is expanded to some extent in this latter case.

In order to implement the method, use may be made of one or another known method of fractional freezing, for instance the method disclosed in European Patent Application Publication No. 506 987.

The mixtures of the ice compositions may be formed taking account of the nature of the reagents and the respective volumes of the layers of ice required, as necessary, by the shape of the article, in proportions enabling a reaction that is as complete as possible. This being the case, the level of effervescence may be adjusted as a function of the concentrations of the reagents.

All edible compounds able to react with one another to produce carbon dioxide in aqueous solution can be used as effervescence reagents. Use is preferably made, on the one hand, of an appropriate hydrosoluble carbonate, for instance sodium or potassium bicarbonate and, on the other hand, of an acid, for instance malic, tartaric, lactic or preferably citric acid.

The production of the compositions takes place conventionally by dissolving the effervescence agent in the aqueous phase, followed by pasteurisation, expansion and freezing.

If it is desired to produce a single-flavour product, it is possible to carry out the pasteurisation of a single mixture which can then be separated into several portions, for instance two, then to add the appropriate effervescence reagent to each portion.

According to a preferred variant of the preparation of compositions, which can be applied to both single and multi-flavour products, the effervescence reagent can be added in the first instance to each of the portions, followed by separate processing by pasteurisation, expansion and freezing.

In order to mask the alien salty and respectively acid tastes imparted by the effervescence reagents, the dry material of the composition containing the acid, for instance, may preferably be increased, for instance by adding carbohydrates in the form of fruit pulp. For this purpose, action may also be taken on the respective volumes of the compositions, for instance by placing the composition containing the bicarbonate in the space occupying the smallest volume, for instance the grooves of a stick which form its periphery. It is also possible to offset any salty or acid tastes by adding aromas as a function of the desired taste. If necessary, these various measures can be combined.

EXAMPLES

The invention is illustrated by the following examples. In these examples, proportions and percentages are by weight unless otherwise specified.

Example 1

In order to produce a single-flavour cola ice lolly stick, a first and a second composition to be iced were prepared separately as follows:

1) 29 parts of liquid saccharose and 49 parts of water were mixed at 60° C. 0.2 parts of stabiliser formed by carrageenans and xanthan gum and 3.5 parts of glucose syrup were then added. 15.5 parts of apple puree, colouring agent and finally 2.1 parts of citric acid were then added thereto. After pasteurisation of the mixture at 86° C. for 23 seconds, the composition was cooled to 4° C. and left to rest for 4 hours at this temperature. It was brought to 100 parts by the addition of cola aroma.

2) A second composition to be iced was prepared as in 1) above, except that the citric acid was replaced by 2.52 parts of sodium bicarbonate.

In order to produce a stick ice lolly, composition 1 as above was introduced into a mould of star-shaped cross-section forming the core of the article, a stick was inserted therein and the composition was frozen, after which the exterior of the mould was reheated and the core demoulded. The core was then introduced into a cylindrical mould exactly adapted to the profile of the branches of the star which had previously been approximately half filled with the second composition. This second composition, which was still liquid, then filled the grooves of the star-shaped stick and froze in contact therewith. The stick therefore containing the two effervescent compositions separate from one another in space was finally demoulded.

Example 2

In order to produce a two-flavour ice lolly stick of the lemonade and orangeade type, a first and a second composition to be iced were prepared as follows:

1) 19.5 parts of liquid saccharose and 63 parts of orangeade were mixed at 60° C. 0.2 parts of stabiliser formed by carrageenans and xanthan gum and 3.5 parts of glucose syrup were then added. 10 parts of apple puree, colouring agent and lastly 2.1 parts of citric acid were then added thereto. After pasteurisation of the mixture at 86° C. for 23 seconds, the composition was cooled to 4° C. and left to rest for 4 hours at this temperature. It was brought to 100 parts by the addition of orange aroma.

2) A second composition to be iced was prepared as in 1) above, except that the citric acid was replaced by 2.52 parts of sodium bicarbonate, the orangeade by lemonade and the orange aroma by lemon aroma.

A stick ice lolly as described in Example 1 was produced.

Example 3

A lemonade-based ice article contained in a small cylinder of plastic material provided with a push piston was produced.

For this purpose, a composition was prepared by mixing 18.5 parts of liquid saccharose and 68 parts of water at 60° C. 0.2 parts of stabiliser formed by carrageenans and xanthan gum and 3.5 parts of glucose syrup were then added. 10 parts of apple puree and colouring agent were added and the mixture was pasteurised at 86° C. for 23 seconds, the composition was cooled to 4° C. and left to rest for 4 hours at this temperature. It was brought to 100 parts by the addition of lemon aroma.

The composition was then divided into two equal portions, then 2.1% of citric acid was added to the first portion and 2.52% of sodium bicarbonate to the second portion.

In order to produce the article, the first portion as above was introduced into a mould of star-shaped cross-section forming the core of the article and the composition was then frozen, after which the exterior of the mould was reheated and the core demoulded. The core was then introduced into a small cylinder of plastic material closed at its base by a push device in the form of a piston, the cylinder being exactly adapted to the profile of the branches of the star, which cylinder had previously been approximately half filled with the second portion. This second portion which was still liquid then filled the grooves of the star-shaped core and froze in contact therewith.

We claim:

1. A frozen ice confectionery product comprising a first ice layer which contains a first effervescence-producing agent and a second ice layer which contains a second effervescence-producing agent, wherein the first and second ice layers are juxtaposed and are not separated by a water-impermeable intermediary, and wherein, upon eating the frozen product, the first and second effervescence-producing agents react to produce carbon dioxide.

2. A frozen ice confectionery product according to claim 1 wherein the first effervescence-producing agent comprises a hydrosoluble carbonate and wherein the second effervescence-producing agent comprises an acid.

3. A frozen ice confectionery product according to claim 1 wherein the first effervescence-producing agent comprises sodium bicarbonate or potassium bicarbonate and wherein the second effervescence-producing agent comprises an acid selected from the group consisting of citric acid, malic acid, tartaric acid and lactic acid.

4. A frozen ice confectionery product according to claim 3 wherein the ice layer having the smallest relative volume in the frozen product contains the bicarbonate.

5. A frozen ice confectionery product according to claim 1 wherein at least one of the ice layers further comprises a fruit pulp.

6. A frozen ice confectionery product according to claim 1 further comprising a stick and being in the form of an ice lolly.

7. A frozen ice confectionery product according to claim 1 having a homogeneous visual appearance.

8. A frozen ice confectionery product according to claim 1 wherein the juxtaposed first and second ice layers are visually contrasting.

9. A frozen ice confectionery product according to claim 1 wherein the juxtaposed first and second ice layers extend longitudinally in an elongate dimension of the frozen product.

10. A frozen ice confectionery product according to claim 1 wherein the juxtaposed first and second ice layers are arranged to form contrasting stripes or helices.

11. A process for making a frozen ice confectionery product comprising:
   introducing into a first mould a first aqueous composition comprising a first effervescence-producing agent;
   freezing the first composition in the first mould to form a first ice layer;

demoulding the first ice layer;

inserting the demoulded first ice layer into a second mould which contains a second aqueous composition comprising a second effervescence-producing agent; and freezing the second composition in the second mould to form a frozen ice confectionery product having juxtaposed first and second ice layers which are not separated by a water-impermeable intermediary and wherein, upon eating the frozen product, the first and second effervescence-producing agents react to produce carbon dioxide.

12. A process according to claim 11 wherein the first effervescence-producing agent comprises a hydrosoluble carbonate and wherein the second effervescence-producing agent comprises an acid.

13. A process according to claim 11 wherein the first effervescence-producing agent comprises sodium bicarbonate or potassium bicarbonate and wherein the second effervescence-producing agent comprises an acid selected from the group consisting of citric acid, malic acid, tartaric acid and lactic acid.

14. A process according to claim 13 wherein the ice layer having the smallest relative volume in the frozen product contains the bicarbonate.

15. A process according to claim 11 wherein at least one of the aqueous compositions further comprises a fruit pulp.

16. A process according to claim 11 wherein the second mould is a plastic casing having a base piston push-closure.

17. A process according to claim 16 further comprising introducing an ice lolly stick into the first aqueous composition before freezing in the first mould.

18. A process according to claim 16 wherein the first and second aqueous compositions further comprise, respectively, contrasting coloring agents which form stripes or helices in the frozen product.

* * * * *